United States Patent [19]
Pillsbury, Jr.

[11] 3,716,029
[45] Feb. 13, 1973

[54] ANIMAL EXERCISING DEVICE
[76] Inventor: Charles H. Pillsbury, Jr., 2253 Stonyvale Road, Tujunga, Calif. 91042
[22] Filed: Jan. 22, 1971
[21] Appl. No.: 108,708

[52] U.S. Cl. ................................................. 119/29
[51] Int. Cl. ............................................. A01k 15/00
[58] Field of Search .......................... 119/29, 117, 121

[56] References Cited

UNITED STATES PATENTS 2,831,457   4/1958   McMurray ............................ 119/29
3,424,132   1/1969   Fischer et al. ........................ 119/29
2,489,438   11/1949  Schrader ............................... 119/29

Primary Examiner—Aldrich F. Medbery
Attorney—William C. Babcock

[57] ABSTRACT

A portable power operated animal exercising device that is relatively light in weight, and can be transported to a desired destination in a collapsed condition to occupy a minimum of space. The device is adjustable both vertically and horizontally to accomodate an animal of a particular height, as well as to vary the radius of the circular path through which the animal is guided in exercising.

7 Claims, 7 Drawing Figures

PATENTED FEB 13 1973　　　　　　　　　　　　　　　　3,716,029
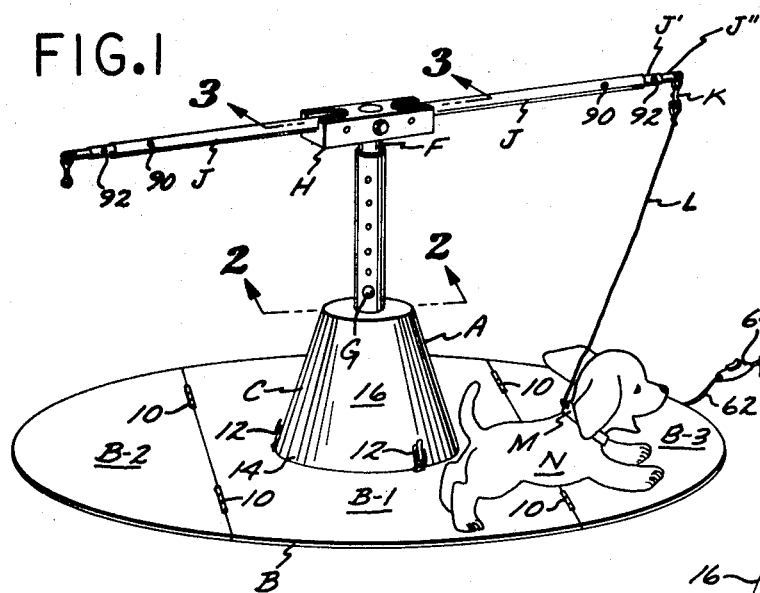
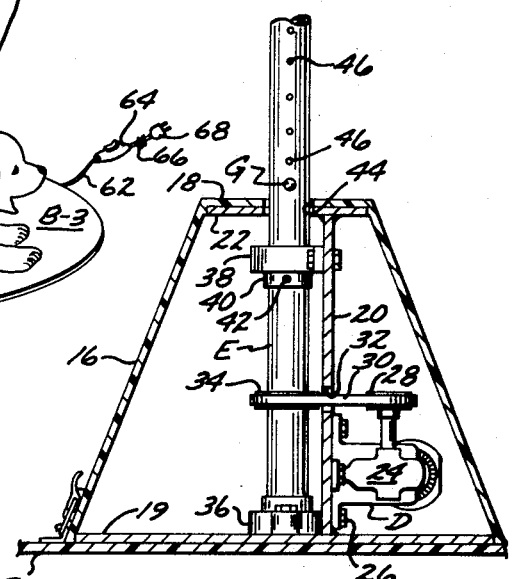
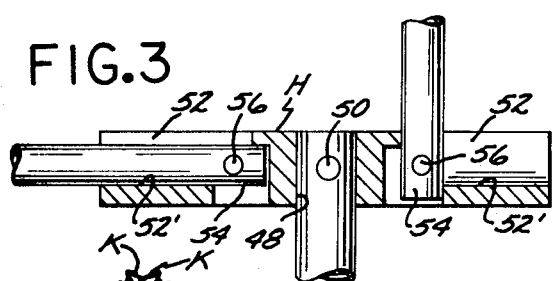
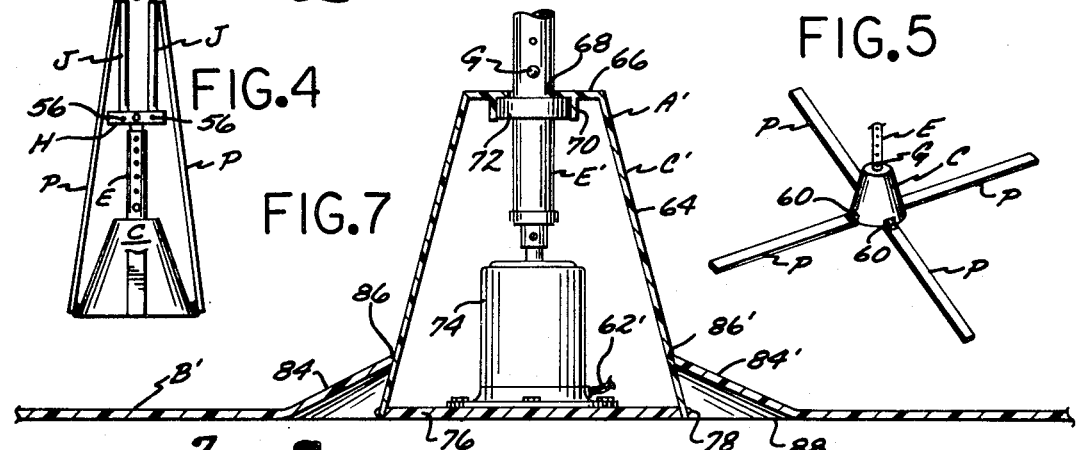
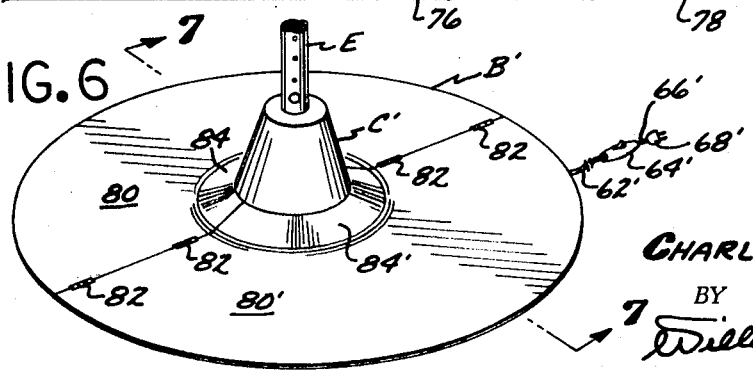
INVENTOR.
CHARLES H. PILLSBURY
BY
William C. Babcock
ATTORNEY

ANIMAL EXERCISING DEVICE

BACKGROUND OF THE INVENTION

1. Field of the Invention

An animal exercising device.

2. Description of the Prior Art

Household pets such as dogs, cats and the like need exercise, particularly walking, to remain in a state of optimum health. In the case of dogs, this is normally accomplished by placing the dog on a leash and walking the animal. However, in cities, this mode of exercising is frequently difficult to carry out, and is time consuming on the part of the owner. In some situations, the owner of an animal will pay a person to physically walk an animal such as a dog, but this approach has the disadvantage that it is expensive over a prolonged period of time.

The primary purpose in devising the present invention is to supply a power operated lightweight, collapsible exercising device for one or more animals. The device when in the collapsed condition occupies a minimum of space for transportation and storage purposes.

Another object of the invention is to supply an exercising device that may be used to concurrently exercise a number of animals without attention on the part of the user thereof.

SUMMARY OF THE INVENTION

An exercising device that includes a collapsible base that supports a housing having a smooth external surface, to prevent damage to an animal by the latter inadvertently coming in contact therewith, and the housing enclosing power operated means that drives an upwardly extending first shaft. A second shaft is adjustably mounted for vertical movement on the first shaft. The second shaft may be varied as to height on the first shaft, dependent upon the size of the animal or animals being exercised.

The second shaft supports a cross head that has one or more tubular arms extending outwardly therefrom, and this tubular arm telescopically supporting arms of smaller diameter. Each assembly of telescopically adjustable arms is so arranged that the leash on an animal to be exercised may be removably secured to the most outwardly disposed portion of the assembly, and the arm assemblies when rotated causing the animal to be exercised to walk in a circular path.

When the arm assemblies are not in use, they are pivoted to upwardly extending positions and removably secured to one another for the exercising device to occupy a minimum of space, which is highly desirable when the device is being stored or transported from one location to another. The power operated means used in rotating the arms is preferably both reversible and adjustable as to speed, and as a result the animals being exercised may be caused to transverse a circular path at a desired pace and in a desired direction.

A major object of the present invention is to supply an animal exercising device that is of an extremely simple mechanical structure, is easy to use, may be collapsed to occupy a minimum of space when being transported or when stored, is adjustable for use with different sized animals, and can exercise the animals by walking them around a circular path of a desired diameter.

Another object of the invention is to supply an animal exercise device that can be fabricated from standard commercially available material, requires no elaborate plant facilities for its production, and may be produced at a sufficiently low price as to encourage the wide-spread use thereof by persons having but a single pet, as well as by kennels where it is necessary to exercise a number of animals concurrently.

BRIEF DESCRIPTION OF THE DRAWING

FIG. 1 is a perspective view of a first form of the invention;

FIG. 2 is a vertical cross sectional view of the first form of the invention taken on the line 2—2 thereof;

FIG. 3 is a fragmentary vertical cross sectional view of the first form of the invention taken on the line 3—3 of FIG. 1;

FIG. 4 is a side elevational view of a modification of the first form of the invention, and showing the same in a collapsed position;

FIG. 5 is a perspective view of the modified first form shown in FIG. 4, but with the base legs pivoted to extend outwardly to prevent the device from being tipped over by the animal or animals being exercised;

FIG. 6 is a perspective view of a second form of the invention; and

FIG. 7 is a vertical cross sectional view of the second form of the invention taken on the line 7—7 of FIG. 6.

DESCRIPTION OF THE PREFERRED EMBODIMENTS

The first form A of the invention as shown in FIGS. 1 and 2 includes a circular base B that has a frusto-conical housing C removably secured thereto. A prime mover D is situated within the confines of the housing C and by means that will later be explained in detail, drives a first vertically disposed shaft E. The first shaft E has a second shaft F telescopically mounted within the confines thereof, and the second shaft being vertically adjustable to a desired height relative to the first shaft E by a pin G or other suitable adjustable means.

The second shaft F has a horizontal cross head H rigidly secured to the upper end thereof, and this cross head pivotally supported two first arms J that extend outwardly therefrom in opposite directions. If desired, additional pairs of first arms J may be provided (not shown) that are intermediately positioned between the two arms J. Each arm J preferably has second and third tubular arms J' and J'' telescopically mounted therein, and the arm J'' on the outer extremity thereof supporting a snap hook K that may be removably secured to a looped end of a leash L that extends to the collar M of the animal N to be exercised. The prime mover D is preferably an electric motor, when the prime mover D is electrically energized, the arms J are cause to rotate in a horizontal plane, and exert forces on the leashes L to cause the animals N to walk in a circular path so long as the prime mover D is energized.

The base B shown in FIG. 1 is preferably circular and is formed from a suitable sheet material. The base B includes three segments B-1, B-2 and B-3 that are pivotally secured to one another by hinges 10 of conventional design, to permit the base to be folded into a compact configuration when the first form of the device A is stored or transported from one location to another. The intermediately positioned base section B-1 has a number of satchel type fasteners 12 secured thereto, which also have portions thereof removably secured to the lower external surface 14 of the housing C.

The housing C includes a side wall 16 that is of frusto-conical shape, and has an upper closed end 18 best seen in FIG. 2. The lower interior portion of the side wall 16 is closed by a base plate 19 that rests on and is secured to the intermediate base section B-1. The lower end of the housing C when mounted on the base section B-1 as shown in FIG. 2 snuggly engages the base plate 19. The base plate 19 supports an upright 20 that develops on its upper end into a circular plate 22 that is adjacently disposed to the upper end 18. The upright 20 has a conventional geared down electrical motor assembly 24 secured thereto by bolts 26 or other conventional fastening means. The motor 24 drives a grooved pulley 28 that is engaged with a horizontally positioned resilient endless belt 30 that extends through an opening 32 in upright 20, and engages a driven pulley 34 mounted on the first shaft E.

The first shaft E has the lower end thereof journalled in a thrust bearing 36 that is secured to the base plate 19. Upright 20 on the upper portion thereof supports a bearing 38 that rotatably supports the first shaft E, and the shaft E directly under the bearing 38 having a collar 40 removably secured thereto by a set screw 42 or the like. The upper end 18 of housing C and plate 22 have vertically aligned openings 44 formed therein through which the first shaft E extends upwardly. The first shaft E has a number of longitudinally spaced transverse pairs of openings 46 formed therein and each pair of these openings capable of being removably engaged by the pin G. The second shaft E has a transverse opening (not shown) therein that may be aligned with any desired one of the pairs of openings 46. By use of the pin G, the second shaft F may be held at any one of a number of vertically disposed elevations above the first shaft E, and the elevation so selected being determined to a large degree by the size of the animal N that is to be exercised.

The head H as may be seen in detail in FIG. 3 is formed from a rectangular block of metal or the like. A centrally disposed vertically extending bore 48 is formed in the head H, and snuggly engages the upper end of the second shaft F. A bolt 50 engages a tapped bore (not shown) that is formed in the head H, and the bolt frictionally engaging the upper end of the second shaft F to hold the head H at a fixed position thereon. The head H has two longitudinally spaced oppositely extending grooves 52 formed therein, and the adjacent end portions 54 of the first arms J being movably disposed therein. Transverse pins 56 extend through openings in the head H and arm portions 54 to pivotally support the first arms J from the head. The lower portions 52' of the grooves 52 serve as stops to prevent the arms J pivoting downwardly below a horizontal position. Openings 58 are formed in the head H and are in communication with the grooves 52 to permit the arms J to be pivoted upwardly to the vertical position shown to the right in FIG. 3 when the device is being transported from one location to another, or when the device is being stored.

The collar 40 permits the first shaft E to be grasped to raise the assembly from a ground surface, without the shaft E being displaced vertically relative to the housing C or motor assembly D. The snap type hooks K shown in FIG. 1 are not only adapted to have the leashes L secured thereto, but the hooks may also be caused to interlock to hold the arms J in an upwardly extending position as shown in FIG. 4 when the device is being transported or when stored.

The modified form of the first form of the invention shown in FIGS. 4 and 5 differs from the form illustrated in FIG. 1, in that the circular base B is omitted therefrom, and instead four base legs P are provided that are pivotally secured to the lower portion of the housing C by pivotal means 60 of a conventional nature. The legs P when the device is being used are pivoted outwardly to the configuration shown in FIG. 5. The pivot means 60 have suitable stops of a conventional nature (not shown) associated therewith to prevent the legs inadvertently pivoting relative to the housing C, after the legs have been disposed in the horizontal position illustrated in FIG. 5.

The housing C, base plate 19, upright 20 and circular plate 22 are preferably formed from fiberglass material. The base B may likewise be formed from the same material if desired. When the housing C occupies the position shown in FIG. 2 on base B, the base plate 10 and the fasteners 12 cooperate to hold the housing C in a fixed stationery position relative to the base. The base plate 19, upright 20 and plate 22 also cooperate with the housing C to provide a rigid structure to support the first and second shafts E and F, and to the extent that the device remains stable even when being used to walk two or more relatively large dogs. Electric power is supplied to the motor assembly D through a cord 62 that extends to a hand operated switch 64 that may not only be used to control the direction of rotation of the motor D, but the speed thereof as well. The switch assembly 64 is connected by an electrical conductor 66 that terminates in a pronged plug 48 that may removably engage a domestic electric outlet (not shown).

A second form A' of the device is illustrated in FIGS. 6 and 7 that includes a frusto-conical side wall 64 that has the upper end thereof closed by a circular plate 66 in which an opening 68 is formed. A circular flange 70 depends from the plate 66 and serves as a support for a bearing 72 that rotatably engages the first shaft E' that in structure is identical to the shaft E previously described. The shaft E' is driven by a low speed high torque electrical motor 74 that is mounted on a base plate 76 that closes the lower end of the housing C'. Base plate 76 is removably secured to housing C' by screws 78 or other suitable fastening means.

The second form A' of the device is above the plate 66 identical with the first form A previously described. A base B' is provided that includes two semicircular segments 80 and 80' that are pivotally connected along their diametrical edges by hinges 82. The semicircular base portions 80 and 80' have upwardly and inwardly extending center portions 84 and 84', which center portions have inner edges 86 and 86' that snuggly engage the lower exterior surface of the housing C', and serve to hold the housing in a stationery position on the floor surface 88 on which it rests. Power is supplied to the motor 74 through a cord 62' in the same manner as cord 62 supplies electrical power to the motor assembly D.

The use and operation of the invention is extremely simple. The invention is transported to a desired location in the collapsed condition, and the base B, legs P or base B', depending on the structure of the device, are caused to rest on the floor surface 88. The arms J are then caused to assume the position shown in FIG. 1, with the second shaft F adjusted to the height that is appropriate for the particular size animals N that are to be exercised. The arms J, J' and J'' are then telescoped outwardly to the extent that the animals N are caused to walk in a circular path of a desired diameter. The arms J and J' are preferably provided with set screws 90 and 92 that hold them in a desired longitudinal relationship with one another.

After the device has been used for exercising purposes and it is desired to transport or store the same, the base B is separated from the assembly shown in FIG. 1, with the sections B-2 and B-3 folded to overlie the section B-1. The arms J are then pivoted upwardly to the position shown in FIG. 4 with the hooks K being interlocked with one another to hold the arms in this position. When the device employs the legs P as shown in FIGS. 4 and 5, the legs can be held in the upwardly extending position as shown in FIG. 4 by hooks or fastening means (not shown) that engage the hook K.

The second form of the invention B' illustrated in FIGS. 6 and 7 is used in the same manner as the first form, and with the base B' being slipped down over the housing C' to rest on the floor surface 88, prior to the arms J being pivoted to the horizontal positions illustrated in FIG. 1.

I claim:

1. A power driven, portable, collapsible animal exercising device for walking at least one animal in a circular path, said animal having a collar mounted thereon to which a leash is attached, said device having a means for compactly arranging it for storage and transportation including:
   a. a base assembly in the form of a plurality of rigid sheets that are in edge abutting contact and are pivotally connected by hinge means, said sheets having a first position of lying flat on a supporting surface and a second position pivoted to a collapsed position where they overlie one another and occupy a minimum of space for storage and transportation purposes;
   b. a housing that includes an upper closed end in which an opening is provided;
   c. first means for releasably supporting said housing in a fixed position relative to said base;
   d. a first shaft that extends into said housing through said opening, said shaft normally disposed to said surface when said base rests thereon;
   e. bearing means in said housing for rotatably supporting said first shaft;
   f. an electric motor, in said housing for rotating said first shaft;
   g. second means for supplying electric power to said motor;
   h. two axially aligned, longitudinally spaced first arms;
   i. a head that pivotally supports the most adjacent portions of said first arms, with said head supporting said first arms in substantially horizontal outwardly extending first positions, and in second upwardly extending positions, said first arms occupying said second position when said device is being stored or transported;
   j. third means for connecting said head to said first shaft; and
   k. fourth means supported from said first arms for removably engaging said leashes to cause said animal to walk in a circular path when said motor is energized to drive said first shaft, head and first arms.

2. An exercising device as defined in claim 1 in which said first means are a plurality of spaced satchel type fasteners that include first and second portions that may removably engage one another and are secured to said housing and to one of said sheets.

3. An exercising device as defined in claim 1 in which said third means is a second tubular shaft secured to said head and slidably engaging said first shaft, and fifth means for holding said second shaft, head and first arms at a desired elevation above said first shaft, to permit the exercising of animals of various heights.

4. An exercising device as defined in claim 1 in which said fourth means are two tubular second arms telescopically mounted on said first arms, fifth means for holding said second arms at desired relationship with said first arms, and spring loaded hook means secured to the extremity of said second arms that may removably engage said leashes to cause said animals to walk in a circular path of a desired radius, which radium is determined to the degree that said second arms extend outwardly from said first arms.

5. A device as defined in claim 1 in which said fourth means includes a plurality of telescopically adjustable arms supported from said first arms, fifth means for holding said telescopically adjustable arms in fixed relationship with one another and with said first arms, and spring loaded hook means supported from the outer extremities of said telescopically adjustable arms that may be removably secured to said leashes to cause said animals to walk in a circular path of a desired radius.

6. An exercising device as defined in claim 8 in which said spring loaded hook may not only engage said leashes, but may engage one another, to hold said arms in an upwardly extending position relative to said first shaft when said device is being stored or transported.

7. An exercising device as defined in claim 1 in which said housing is of frusto-conical shape and the sheets of said base assembly being of semi-circular shape and having upwardly extending arcuate center portions that grip said housing when said sheets are resting on a flat surface.

* * * * *